United States Patent [19]
de Carmo et al.

[11] Patent Number: 5,642,477
[45] Date of Patent: Jun. 24, 1997

[54] METHOD AND APPARATUS FOR SELECTABLY RETRIEVING AND OUTPUTTING DIGITALLY STORED MULTIMEDIA PRESENTATIONS WITH REAL-TIME NON-INTERRUPTING, DYNAMICALLY SELECTABLE INTRODUCTION OF OUTPUT PROCESSING

[75] Inventors: Linden Alanso de Carmo, Plantation; Ronald H. Jones, Jr., Delray Beach; Bradley Dale Noe; William Wallis Lawton, both of Boca Raton; Keith Charles Kelly, Deerfield Beach, all of Fla.

[73] Assignee: International Business Machines Corporation, Armonk, N.Y.

[21] Appl. No.: 310,728

[22] Filed: Sep. 22, 1994

[51] Int. Cl.⁶ .................................................. G06F 3/00
[52] U.S. Cl. ................................. 395/806; 395/551
[58] Field of Search .............................. 395/550, 154

[56] References Cited

U.S. PATENT DOCUMENTS 4,637,014 1/1987 Bell et al. .
5,173,900 12/1992 Miller et al. .
5,191,410 3/1993 McCalley et al. .
5,214,649 5/1993 Van As et al. .
5,285,199 2/1994 Pocek .
5,287,360 2/1994 Regent .
5,319,707 6/1994 Wasilewski et al. .
5,333,299 7/1994 Koval et al. .

*Primary Examiner*—Thomas M. Heckler
*Attorney, Agent, or Firm*—Mark S. Walker; Andrew J. Dillon

[57] ABSTRACT

Disclosed are methods and apparatus that facilitate the introduction of filters, converters and effects into an active multimedia stream without interruption of the presentation. A control module or sequence permits such introduction only after verifying the presence of a sufficient supply of buffered presentation data. Responding to a user's request for introduction of a filter, the invention first determines whether its immediate implementation would cause interruption, and either introduces the filter, converter or effect into the data stream as backlogged data continues to be presented, or postpones its introduction until sufficient buffered data does exist.

19 Claims, 3 Drawing Sheets

METHOD AND APPARATUS FOR SELECTABLY RETRIEVING AND OUTPUTTING DIGITALLY STORED MULTIMEDIA PRESENTATIONS WITH REAL-TIME NON-INTERRUPTING, DYNAMICALLY SELECTABLE INTRODUCTION OF OUTPUT PROCESSING

FIELD OF THE INVENTION

This invention relates to methods and apparatus for operating a multimedia computer platform, and in particular to facilitating dynamic, real-time insertion of multimedia converters, effects and filters into an active multimedia data stream.

BACKGROUND OF THE INVENTION

Multimedia systems integrate multiple sources of digitally represented audio and video for simultaneous, synchronized presentation over an integrated set of output devices. For example, audio information might be stored on magnetic tape or a compact disc (CD), or introduced directly into the presentation from a microphone coupled to a digital sampler; video information can originate with a videodisc, CD (possibly, although not necessarily, the same CD containing audio information), or an active digital video camera. A multimedia presentation can also include graphical components, text, and still images, all stored digitally and introduced into the presentation at appropriate times. The presentation is conveyed to a viewer over output devices capable of converting the various digital representations into their native form. Multimedia output systems can range, for example, from no more than a computer-driven video monitor and associated sound hardware to integrated high-end stereo and digital video projection systems.

Managing the retrieval, integration, synchronization and overall flow of multimedia information, which can involve prodigious amounts of digital data even for relatively short presentation sequences, represents a substantial task. Ordinarily, computational responsibility for the various routing and control aspects of multimedia presentations is shared between a high-level multimedia application program, with which the user interacts to compose, edit, and view the presentation, and a multimedia operating system that performs basic, low-level operations such as data retrieval and output-device designation. This architecture simplifies the creation of multimedia applications by relieving programmers of the need to repeatedly specify routine data-handling operations at the computer system's most basic level; the multimedia operating system acts as a bridge between high-level, user-oriented application tasks and low-level input/output (I/O) and processor commands.

Among the tasks performed by the multimedia operating system is designation and control of output devices. Ordinarily, even digitally operated output devices do not accept streams of raw digital data directly, but instead operate through associated "device drivers." These modules, which ordinarily are specific to the devices they control, manage the flow of incoming data (perhaps converting it into a more appropriate form of electrical signal) and issue the control signals that actually operate the devices.

Recognizing the growing importance of multimedia applications, designers of basic computer operating sysems have upgraded their systems to include specific facilities for multimedia support. These systems effectively have "built-in" multimedia architectures that programmers can invoke as appropriate. Representative of such systems is the IBM Multimedia Presentation Manager/2™ (MMPM/2™), supplied by International Business Machines Corporation (IBM) as an extension to its OS/2® operating system.

Important capabilities of MMPM/2 include synchronizing the sources of multimedia data and ensuring that constant streams of data are provided to active device drivers, thereby avoiding gaps in presentation. Because of differences in data-handling rates by various system components, the latter task can be complex. For example, audio data might be retrieved from mass storage in discrete blocks, each requiring a minimum disk access and data-retrieval time, and used to drive an output amplifier whose processing rate depends on the manner in which audio is digitally represented (e.g., the rate at which it was originally sampled). Were no provision made to reconcile the variety of data-handling rates, each mass-storage access sequence would produce a gap in presentation, and the device driver (which frequently outputs data more slowly than it can be retrieved from mass storage) might quickly become overloaded with data.

MMPM/2 addresses this problem with a buffering scheme that stores in volatile memory blocks of data retrieved from mass storage. The device driver obtains data from the buffer instead of from mass storage, and control software ensures that the buffer contains at least some data throughout presentation, thereby avoiding output interruptions.

Unfortunately, the data-handling problem increases substantially in complexity when additional features are introduced into the system, particularly during presentation. Suppose, returning to the above example, that a user wishes to introduce some type of audio filter or effect (e.g., an echo filter) even as audio output is being retrieved and provided to the output amplifier. A gap in presentation would necessarily result from the computational operations that divert the audio data stream from the output device to the filter, which has a characteristic throughput delay time that augments the gap. Similarly, were the user to remove the filter or effect in real-time, a new gap would be introduced as the stream is re-diverted directly to the output device. Straightforward buffering schemes, such as that of MMPM/b 2,cannot reliably eliminate this limitation.

SUMMARY OF THE INVENTION

The present invention facilitates introduction of filters, converters and effects into an active multimedia stream, without interruption of the presentation, through an intelligent control module that permits such introduction only after verifying the presence of a sufficient supply of buffered presentation data. Responding to a user's request for introduction of a filter, the controller first determines whether its immediate implementation would cause interruption. The controller accomplishes this by inspecting the contents of all data buffers and calculating the time to their depletion based on the current data streaming rate. The controller then compares this time to the expected delay resulting from diversion of the data path to the filter and from the intrinsic filter throughput delay. The controller either introduces the filter into the data stream as backlogged data continues to be presented, masking the resulting delays in availability of new presentation data, or postpones introduction of the filter until sufficient buffered data does exist.

In the former case, the output of the filter is introduced directly into the data buffers even as previously stored, unfiltered source data continues to drive the multimedia presentation. By storing the filtered data contiguously with the unfiltered data, the output it represents is integrated seamlessly into the multimedia presentation, and will be observed by the user after all of the unfiltered data has been extracted from the buffers and used to drive an output device.

The user can reverse this operation, requesting removal of the filter, converter or effect, in which case the controller will implement the command so long as the data buffers contain adequate data to mask diversion of the data path from the filter to the original source of data.

BRIEF DESCRIPTION OF THE DRAWINGS

The foregoing discussion will be understood more readily from the following detailed description of the invention, when taken in conjunction with the accompanying drawings, in which.

DESCRIPTION OF THE PREFERRED EMBODIMENT

The present invention is best understood in the context of MMPM/2. However, while representative of the multimedia architectures with which the present invention can be employed, MMPM/2 is by no means the only such architecture. The present invention is suited to use in conjunction with any multimedia operating system that utilizes buffering to provide an uninterrupted source of data to output devices during presentation, and the ensuing discussion is intended in an exemplary, rather than limiting sense.

Figure 1:
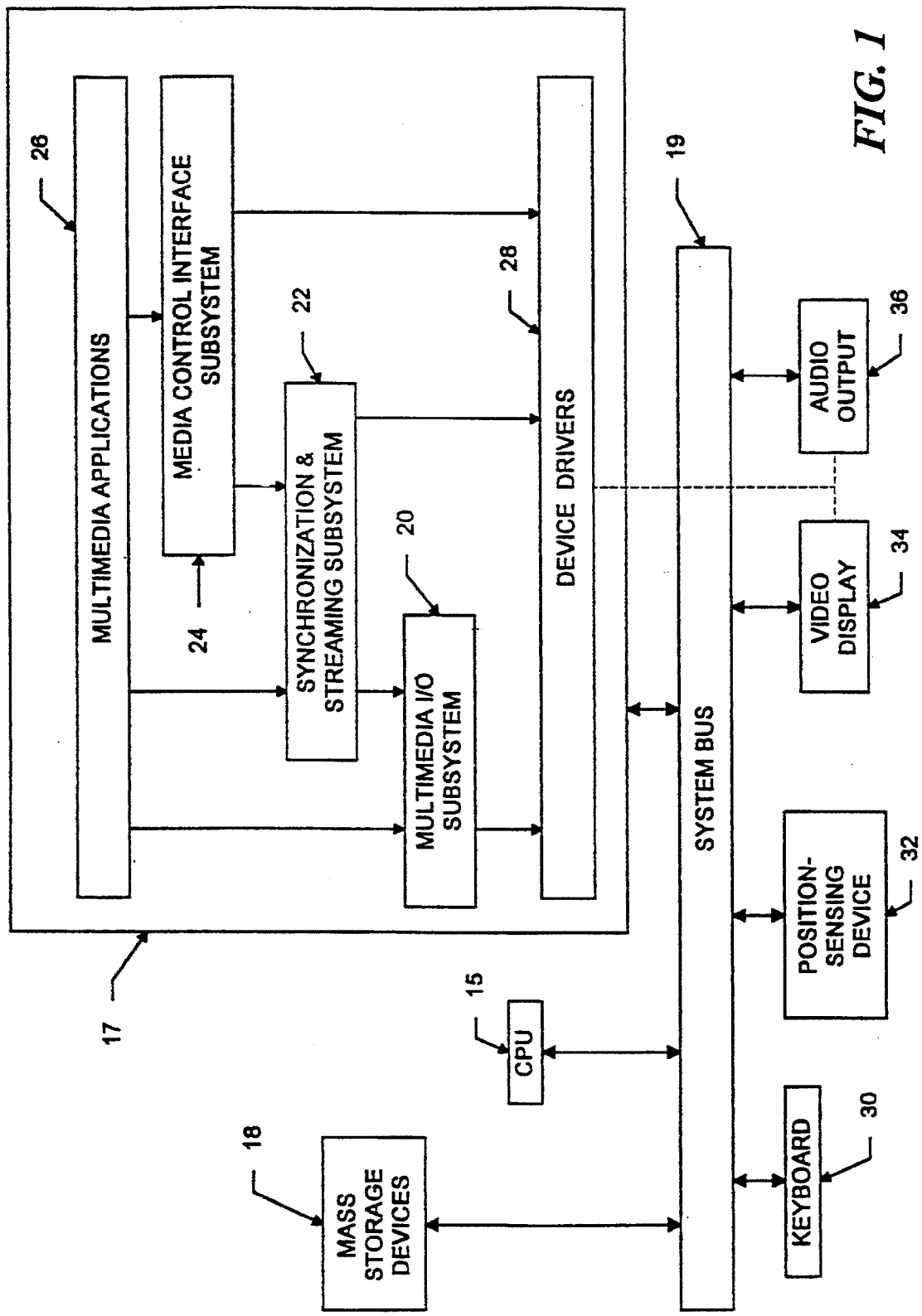
FIG. 1 schematically illustrates a representative multimedia hardware environment.

The elements of MMPM/2 and its hardware context are illustrated in FIG. 1. The computer system within which MMPM/2 operates includes a central-processing unit 15, which performs operations on and interacts with a main system memory 17 and components thereof. System memory 17 typically includes volatile or random-access memory (RAM) for temporary storage of information, including the various components of MMPM/2, buffers, and portions of the computer's basic operating system. The system typically also includes read-only memory (ROM) for permanent storage of the computer's configuration and additional portions of the basic operating system, and at least one mass storage device 18, such as a hard disk and/or CD-ROM drive. All components of the system communicate over a bidirectional system bus 19.

MMPM/2, the components of which reside in system memory 17 during operation, includes a multimedia I/O (MMIO) subsystem 20, a synchronization and streaming interface (SSI) subsystem 22, and a media control interface (MCI) subsystem 24. These three modules execute task commands issued by one or more multimedia application programs 26 and communicate directly with a series of output device drivers 28.

Briefly, MMIO subsystem 22 contains operating routines that simplify accessing and manipulation of the very large digital files that characterize multimedia presentations. MCI 24 manages the operation of output devices, providing multimedia applications 26 with a general interface to control multimedia devices. This enables, for example, multimedia applications 26 to designate "logical," rather than specific output devices, sending commands through either a procedural interface or a string-based command interface. MCI 24 determines and activates the most appropriate output device at a given time. SSI 22 provides multimedia applications 26 with the ability to ensure a constant flow of synchronized data to device drivers 28. Without this facility, the frequent retrieval calls to mass-storage devices would cause breaks or pauses in the output presentation, and synchronization among various storage devices and data files would require substantial programming effort. Further description of MMPM/2 is contained in MULTIMEDIA PRESENTATION MANAGER/2 PROGRAMMING GUIDE (1992), published by IBM, and U.S. Pat. No. 5,333,299 (Koval et al., SYNCHRONIZATION TECHNIQUES FOR MULTIMEDIA DATA STREAMS); the contents of both of these publications are hereby incorporated by reference.

The user interacts with the system using a keyboard 30 and a position-sensing device (e.g., a mouse) 32. The output of either device can be employed to designate information or select particular areas of a video screen display 34 when the user programs, configures or customizes multimedia applications 26. Ordinarily, interactions between the user and applications 26 are managed through a suitable graphical user interface appearing on display 34. During multimedia presentations, device drivers 28 operate video display 34 and an audio output (e.g., an amplifier and speaker) over bus 19. SSI 22 retrieves multimedia information files from mass storage devices 18 and manages the disposition of data to device drivers 28 so as to achieve device synchronization and avoid interruptions in presentation.

Figure 2:
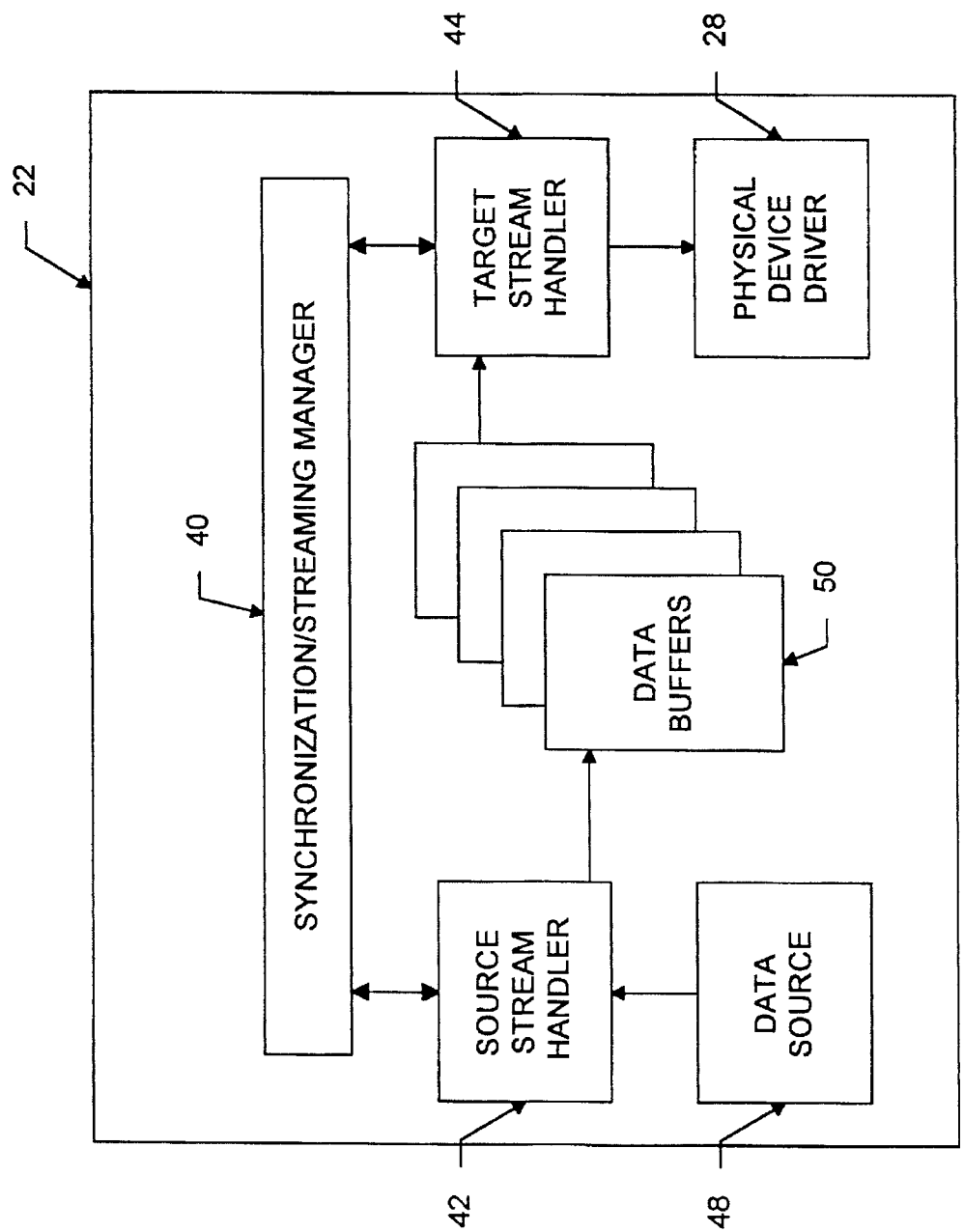
FIG. 2 schematically illustrates those components of the Synchronization/Stream Interface of MMPM/2 relevant to the present invention and their operation.

The operation and internal organization of this component are depicted in greater detail in FIG. 2. A synchronization/ streaming manager 40 connects a source of multimedia data (e.g., a mass storage device or a block of system memory) to a destination or target device for that data. Multimedia data can take numerous forms; for example, audio data types include MIDI (musical instrument digital interface) data and ADPCM (adaptive delta pulse code modulation) compressed data. The important common feature of multimedia data is a temporal flow pattern of audio and/or visual information that is preserved in the data when stored, retrieved and provided to output devices.

Maintaining the temporal integrity of multimedia data and ensuring continuous presentation is an important function of SSI 22. In particular, the data in a multimedia system must reach the output device as a continuous stream despite the fact that source data is necessarily obtained and handled in discrete blocks. A series of "stream handlers," whose operation is supervised by manager 40, perform this function in MMPM/2.

A single multimedia presentation may involve several data streams, each originating with a different storage device or file and destined for output on a different (but synchronized) output device. Manager 40 assigns a pair of stream handlers, representatively illustrated at reference numerals 42 and 44, to a particular data source and to its destination output device. The capabilities of MMPM/2 are such that more than one pair of source and destination stream handlers can operate simultaneously, their outputs being synchronized by manager 40. Stream handler 42, designated as the source stream handler, obtains blocks of data from a data source 48 (e.g., a mass storage device 18) and loads them into a series of memory buffers 50. These are partitions of system memory 17, designated and allocated by manager 40 as described in the '299 patent. Stream handler 44, designated as the target stream handler, retrieves data from data buffers 50 and provides it to an associated device driver 28, which operates the output device for which the data is intended. Stream handlers 42, 44 operate at different rates that characterize their designated functions. Stream handler 42 obtains data in discrete blocks, and its speed of operation is ultimately dictated by factors such as device access times. Stream handler 44, by contrast, may or may not pass data to device driver 28 in blocks, and its rate of data handling reflects the presentation rate of the output device. In order to ensure an uninterrupted supply of data to device driver 28 (so as to avoid presentation gaps), stream handlers 42, 44 interoperate to maintain at least some data in buffers 50 at all times during presentation.

The size and number of buffers 50 depend on the type of multimedia data retrieved by source stream handler 42. For example, in the case of low-quality audio (e.g., 11 kHz represented at 8 bits), buffers of 4–16 kilobytes (kbytes) may suffice, while high-quality audio (e.g., 44 kHz represented at 16 bits), buffers of 32–64 kbytes may prove desirable. Buffer sizing for various types of data is discussed in the '299 patent and in MULTIMEDIA PRESENTATION MANAGER/2 PROGRAMMING GUIDE.

The present invention allows a user to interpose a filter, converter or effect between data source 48 and device driver 28, modifying the data stream before it reaches device driver 28 in a manner that does not interrupt presentation. Hereafter, we use the term "filter" to denote any processor, device or algorithm that transforms data from one format to another, and to include features that might otherwise be categorized as converters or effects. The present invention can support a wide variety of audio and video filters well-known in the art. Useful audio filters include (but are not limited to) echo and reverb devices, sampling-rate converters, devices that change acoustic parameters (e.g., to simulate different listening environments), fade-in and fade-out, volume control, mixers, mergers, and splitters; useful video filters include fade-in and fade-out, and visual effects such as sparkles.

Figure 3:
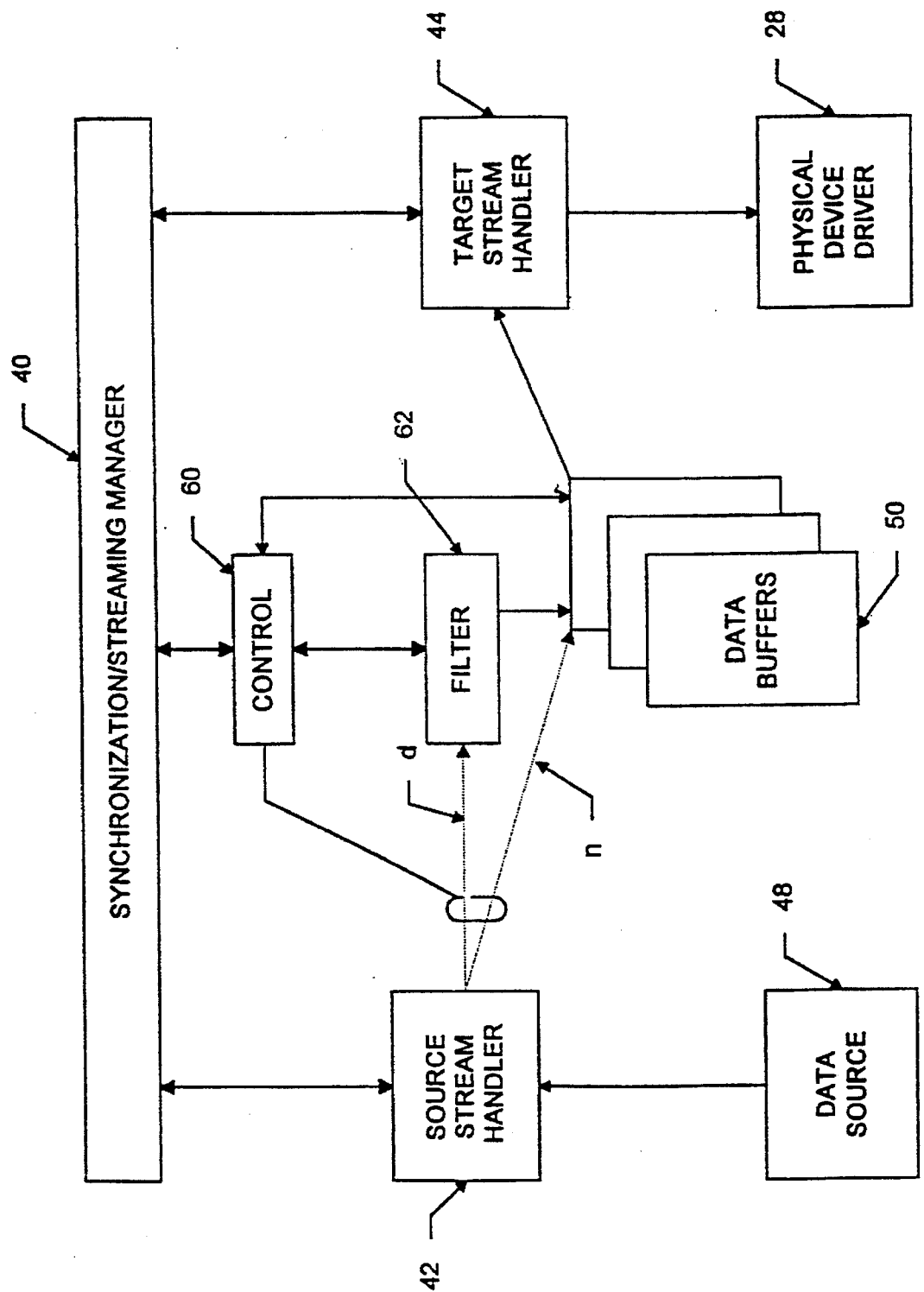
FIG. 3 schematically illustrates a representative implementation of the present invention.

The components and operation of the invention (in the illustrative context of MMPM/2) are illustrated in FIG. 3. A controller 60, operating under or integral with manager 40, responds to a user command (conveyed using keyboard 30 or mouse 32, and over bus 19) to introduce a filter 62 into the data stream currently routed to device driver 28. Before this command, buffers 50 have been receiving data from source stream handler 42 along normal path n. If the conditions described below are satisfied, controller 60 breaks connection path n between stream handler 42 and buffers 50, diverting source data along a new path d to filter 62. Filter 62 processes the data in a manner that preserves its temporal flow pattern and stores the processed data in data buffers 50, where it is available for extraction and routing by target stream handler 44.

The rerouting operation, whereby data is diverted from path n to path d, ordinarily takes some finite amount of time, during which data already accumulated in buffers 50 (along path n) is simultaneously streaming, via target stream handler 44, to device driver 28. (The diversion time is preferably minimized by setting up path d before data is actually diverted.) In addition, filter 62 will ordinarily have some associated throughput delay time before the first bits of data entering filter 62 have been processed and are available for storage in buffers 50. A break in presentation will occur if buffers 50 are depleted of data before new data streams in from filter 62.

Therefore, prior to fulfilling the user's command by diverting data to filter 62, controller 60 determines whether this would cause interruption by calculating the time to buffer depletion and comparing this to the expected time delay resulting from data diversion and filter throughput. Controller 62 calculates the time to buffer depletion through assessment of the amount of data in buffers 50 and the streaming rate; the latter quantity is a function of the data type and the device driver, and may be obtained from target stream handler 44 or by table lookup. The data diversion time is ordinarily a fixed quantity dictated by the hardware, and is therefore stored in memory associated directly with controller 60; the filter throughput delay depends on the nature of filter 62 (the characteristics of which frequently are not fixed, but may instead by selected by the user), and is most easily obtained by table lookup and/or straightforward calculation based on selected filter parameters.

Assuming that controller 60 determines that adequate data exists in buffers 50 to accommodate the data diversion and filter throughput delay, it will interpose filter 62 as discussed above. The resulting filter effect will not be observed by the user until some time later, after the unfiltered data has been fully cleared from buffers 50. Controller 60 also permits the user to reverse the selection of filter 62. In this case, controller 60 assesses the time to buffer depletion against the diversion delay and diverts data from path d to path n if buffer 50 contains adequate data.

The foregoing discussion has assumed an active output data stream to a device driver. The invention can also operate in situations where data is not actually streaming by merely rerouting the output of stream handler 42 from path n to path d. In this situation, obviously, there is no need for measures to avoid an output delay.

The foregoing discussion has also assumed a relatively simple buffering arrangement, whereby a common set of buffers is shared by stream handlers 42 and 44. MMPM/2, through manager 40, in actuality assigns distinct buffer sets to each stream handler (and, potentially, to filter 62 as well) based on a "negotiation" process described in the '299 patent and in MULTIMEDIA PRESENTATION MANAGER/2 PROGRAMMING GUIDE. In particular, the outcome of this process is dictated by parameters including the size and number of available buffers and the type of presentation data stored therein. The type and organization of buffers is not critical to the present invention, however, which can be used with any multimedia system that utilizes a buffering system to retain data on an interim basis before it is presented on an output device.

It will therefore be seen that the foregoing represents a highly desirable approach to real-time, dynamic introduction of filters, converters and effects into an active multimedia stream without interrupting the ultimate output presentation. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits.

What is claimed is:

1. Apparatus for selectably retrieving and outputting digitally stored multimedia presentations with real-time, non-interrupting, dynamically selectable introduction of output processing, the apparatus comprising:

a. at least one storage device having stored thereon visual or audio data representative of a presentation having a temporal flow pattern;

b. at least one memory buffer;

c. first transfer means for loading the presentation data from the storage device into the buffer as a first data stream that preserves the temporal flow pattern;

d. second transfer means for extracting the presentation data from the buffer as a second data stream in accordance with and at a rate representative of the temporal flow pattern, and making the extracted data available for presentation, the first and second transfer means interoperating to ensure a continuous queue of presentation data in the buffer; and e. processing means selectably interposed between the buffer and the first transfer means for processing the data without interruption of the second transfer means, the processing means comprising:

i. a filter for altering the presentation data, the filter having a throughput delay time and an output;

ii. a controller for selectably diverting the first data stream to the filter, the diversion requiring a delay time;

iii. filter transfer means for loading filter output into the buffer; and iv. interrupt guarding means for preventing operation of the controller if the filter throughput and diversion delay times collectively exceed the time necessary, when the processing means is selected, for the second transfer means to extract the data in the buffer.

2. The apparatus of claim 1 wherein the at least one memory buffer comprises:

a. at least one source memory buffer associated the first transfer means;

b. at least one destination memory buffer associated with the second transfer means;

and further wherein c. the first transfer means comprises means for conveying data obtained from the storage device to the source buffer as a data stream that preserves the temporal flow pattern; and d. the second transfer means comprises means for conveying data extracted from the source buffer to an output device for presentation at a rate corresponding to the temporal flow pattern and storing, in the destination memory buffer, data conveyed by the first transfer means at a rate exceeding the presentation rate.

3. The apparatus of claim 2 wherein the source and destination memory buffers are variably sized, and further comprising means for determining the size of each buffer.

4. The apparatus of claim 3 further comprising means for redesignating a portion of at least one of the source memory buffer and the destination memory buffer to define the processing buffer.

5. The apparatus of claim 2 wherein the processing means further comprises:

a. a processor memory buffer for accumulating data from the first transfer means; and b. input means for extracting data from the processor memory buffer and transferring the data to the filter.

6. The apparatus of claim 1 further comprising an output device and wherein the second transfer means comprises means for conveying the extracted data to the output device.

7. The apparatus of claim 6 wherein the output device is an audiovisual display.

8. The apparatus of claim 6 further comprising a device driver interposed between the conveying means and the output device.

9. The apparatus of claim 1 comprising multiple sets of first and second transfer means, and wherein the single processing means is selectably interposed simultaneously between said multiple first and multiple second transfer means.

10. The apparatus of claim 1 wherein the filter is an audio filter, converter or effect.

11. The apparatus of claim 1 wherein the filter is a video filter, converter or effect.

12. A method of facilitating real-time, dynamically selectable processing of multimedia data without interrupting presentation thereof, the method comprising the steps of:

a. providing a multimedia data-handling system comprising:

i. at least one storage device having stored thereon visual or audio data representative of a presentation having a temporal flow pattern;

ii. a memory;

iii. a filter for altering the presentation data, the filter having a throughput delay time;

b. continuously withdrawing presentation data from the storage device and buffering the data in the memory in a manner that preserves the temporal flow pattern;

c. continuously extracting the presentation data from the memory in accordance with and at a rate representative of the temporal flow pattern, and so as to maintain a continuous queue of presentation data in the memory;

d. making the extracted data available for presentation;

e. facilitating selectable diversion of the extracted data to the filter prior to buffering the data;

f. buffering the filtered data in the memory; and g. preventing the diversion if the filter throughput delay time exceeds the time necessary for the data currently in the memory to be extracted.

13. The method of claim 12 further comprising the step of conveying the extracted data to an output device.

14. The method of claim 13 wherein the output device is an audiovisual display.

15. The method of claim 13 further comprising the step of conveying the extracted to a device driver coupled to the output device.

16. The method of claim 12 wherein the diversion requires a delay time and wherein the diversion prevention step includes preventing diversion if the filter throughput and diversion delay times collectively exceed the time necessary for the data currently in the memory to be extracted.

17. The method of claim 12 wherein the filter is an audio filter, converter or effect.

18. The method of claim 12 wherein the filter is a video filter, converter or effect.

19. A computer program product for use in a computer system having at least one storage device having stored thereon multimedia data representative of a presentation having a temporal flow pattern and at least one memory buffer, the computer program product comprising:

a computer usable medium having computer readable program code means embodied in said medium for selectably retrieving and outputting digitally stored multimedia presentations with real-time, non-interrupting, dynamicaly selectable introduction of output processing, the computer readable program code means comprising:

first program code means for loading the presentation data from the storage device into the buffer as a first data stream that preserves the temporal flow pattern;

second program code means for extracting the presentation data from the buffer as a second data stream in accordance with and at a rate representative of the temporal flow pattern, and making the extracted data available for presentation, the first and second program code means interoperating to ensure a continuous queue of presentation data in the buffer; and third program code means for processing the presentation data output by the first program code means without interruption of the second program code means, before the presentation data is loaded in the buffer, the third program code means including filter code means for altering the presentation data, the filter code means having a throughput delay time and an output;

controller code means for selectably diverting the first data stream to the filter code means, the diversion having a delay time;

filter transfer code means for loading the output of the filter code means into the buffer; and interrupt guarding code means for preventing the operation of the controller code means if the filter throughput and diversion delay times collectively exceed a time necessary, when the third program code means is selected, for the second program code means to extract the data in the buffer.

* * * * *

UNITED STATES PATENT AND TRADEMARK OFFICE
CERTIFICATE OF CORRECTION

PATENT NO. : 5,642,477
DATED : June 24, 1997
INVENTOR(S) : de Carmo et al.

It is certified that error appears in the above-indentified patent and that said Letters Patent is hereby corrected as shown below:

Column 2, line 39: change "MMPM/b" to --MMPM/2,--.

Column 2, line 40: delete "2,".

Signed and Sealed this

Twenty-fifth Day of November, 1997

Attest:

BRUCE LEHMAN

*Attesting Officer*   *Commissioner of Patents and Trademarks*